(12) United States Patent
Laimgruber et al.

(10) Patent No.: US 12,485,876 B2
(45) Date of Patent: Dec. 2, 2025

(54) METHOD AND CONTROL FOR A DRIVE SYSTEM HAVING FOUR-WHEEL DRIVE

(71) Applicant: MAGNA Powertrain GmbH & Co KG, Lannach (AT)

(72) Inventors: Stefan Laimgruber, Graz (AT); Johannes Fuchs, Graz (AT); Daniel Lindvai-Soos, Graz (AT); Markus Thier, Vienna (AT); Simon Kaimer, Heiligenkreuz am Waasen (AT)

(73) Assignee: MAGNA Powertrain GmbH & Co KG, Lannach (AT)

( * ) Notice: Subject to any disclaimer, the term of this patent is extended or adjusted under 35 U.S.C. 154(b) by 194 days.

(21) Appl. No.: 18/016,037

(22) PCT Filed: Jun. 9, 2021

(86) PCT No.: PCT/EP2021/065449
§ 371 (c)(1),
(2) Date: Jan. 13, 2023

(87) PCT Pub. No.: WO2022/012817
PCT Pub. Date: Jan. 20, 2022

(65) Prior Publication Data
US 2023/0271600 A1 Aug. 31, 2023

(30) Foreign Application Priority Data
Jul. 16, 2020 (DE) .................... 10 2020 208 929.9
Sep. 10, 2020 (DE) .................... 10 2020 211 396.3

(51) Int. Cl.
B60W 20/40 (2016.01)
B60K 6/387 (2007.10)
(Continued)

(52) U.S. Cl.
CPC ............. *B60W 20/40* (2013.01); *B60K 6/387* (2013.01); *B60K 6/442* (2013.01); *B60K 6/52* (2013.01);
(Continued)

(58) Field of Classification Search
CPC ...... B60W 20/40; B60W 10/02; B60W 10/06; B60W 10/08; B60W 10/119;
(Continued)

(56) References Cited

U.S. PATENT DOCUMENTS

2004/0147366 A1* 7/2004 Aoki .................. B60K 6/52
477/6
2010/0170732 A1* 7/2010 Glaser .................. F16H 37/065
180/65.245
(Continued)

FOREIGN PATENT DOCUMENTS

DE 102010050217 A1 5/2012
DE 102014218402 A1 * 3/2016
(Continued)

OTHER PUBLICATIONS

European Patent Office, Rijswijk, Netherlands, International Search Report of International Application No. PCT/EP2021/065449, Mailed Sep. 7, 2021, 2 pages.

*Primary Examiner* — Anne Marie Antonucci
*Assistant Examiner* — Jewel A Kuntz
(74) *Attorney, Agent, or Firm* — Dickinson Wright PLLC

(57) ABSTRACT

A method is provided for operating a drive train comprising an internal combustion engine or an electric machine as a primary drive and an electric machine as a secondary drive, wherein the electric machine is detachably coupled, together with an inverter and controller, on one of the vehicle axles. The electric machine and at least one switchable element is actuated in order to minimize drag losses of the electric (Continued)

machine and to provide a defined connection time for the electric machine. The electric machine is stationary and decoupled during a first speed range. The electric machine is actuated at a preset speed during a second speed range, where a defined connection time is not possible if the electric machine were stationary. The electric machine is coupled to the axle and rotates at the vehicle speed in the third range, when losses while coupled are lower than if uncoupled.

16 Claims, 3 Drawing Sheets

(51) Int. Cl.
| | | |
|---|---|---|
| *B60K 6/442* | (2007.10) | |
| *B60K 6/52* | (2007.10) | |
| *B60W 10/02* | (2006.01) | |
| *B60W 10/06* | (2006.01) | |
| *B60W 10/08* | (2006.01) | |
| *B60W 10/119* | (2012.01) | |

(52) U.S. Cl.
CPC ............ *B60W 10/02* (2013.01); *B60W 10/06* (2013.01); *B60W 10/08* (2013.01); *B60W 10/119* (2013.01); *B60W 2510/081* (2013.01); *B60W 2520/10* (2013.01); *B60W 2710/081* (2013.01); *B60Y 2200/92* (2013.01); *B60Y 2400/604* (2013.01); *B60Y 2400/82* (2013.01)

(58) Field of Classification Search
CPC ....... B60W 2510/081; B60W 2520/10; B60W 2710/081; B60W 2710/021; B60W 20/15; B60K 6/387; B60K 6/442; B60K 6/52; B60K 6/448; B60Y 2200/92; B60Y 2400/604; B60Y 2400/82; Y02T 10/62; Y02T 10/92
See application file for complete search history.

(56) References Cited

U.S. PATENT DOCUMENTS

| | | | |
|---|---|---|---|
| 2012/0186391 A1* | 7/2012 | Boskovitch | B60K 6/46 |
| | | | 180/65.245 |
| 2013/0187585 A1* | 7/2013 | Niemann | H02P 29/028 |
| | | | 318/400.21 |
| 2015/0046011 A1 | 2/2015 | Imai et al. | |
| 2015/0340975 A1 | 11/2015 | Yanagi et al. | |
| 2017/0174097 A1* | 6/2017 | Gillespey | B60L 3/12 |
| 2020/0346659 A1* | 11/2020 | Düser | B60W 30/18072 |

FOREIGN PATENT DOCUMENTS

| | | | |
|---|---|---|---|
| DE | 102017212554 A1 * | 1/2019 | |
| EP | 2018290 A2 | 1/2009 | |

* cited by examiner

METHOD AND CONTROL FOR A DRIVE SYSTEM HAVING FOUR-WHEEL DRIVE

CROSS-REFERENCE TO RELATED APPLICATIONS

This application is a National Stage of International Application No. PCT/EP2021/065449, filed Jun. 9, 2021, which claims priority to DE 10 2020 208 929.9 filed Jul. 16, 2020 and DE 10 2020 211 396.3 filed Sep. 10, 2020. The entire disclosures of each of the above applications are incorporated herein by reference.

FIELD

The present disclosure relates to a method for operating a drive train comprising an internal combustion engine or an electric machine as a primary drive and an electric machine as a secondary drive, wherein the electric machine is detachably mounted, together with an inverter and a controller, on one of the vehicle axles.

The present disclosure also relates to a controller for carrying out the method.

BACKGROUND

This section provides information related to the present disclosure which is not necessarily prior art.

The trend toward purely electric and hybrid electric vehicles is unceasing and manufacturers of passenger cars and light commercial vehicles throughout the world are seeking simple and proven electric traction and transmission systems in order to take into account the rapid development of vehicle models. One component of this development is the electric axle which comprises an electric machine, transmission components, and an inverter in one assembly.

The electric axle is simply mounted either on the front or rear axle of passenger cars and light commercial vehicles, depending on the architecture and the application. In addition to purely electric vehicles, electric axles are also suitable for P4 hybrid vehicles in which the electric axle forms a secondary drive unit.

Such an electric axle is known from DE 10 2010 050 217 A1, comprising an electric machine which has a stator and a rotor, comprising at least one transmission which has an input element connected to the rotor as well as at least one output element which can be connected to a differential for distributing drive power to two output shafts, wherein the transmission is designed to establish at least two different transmission ratios, and comprising a housing.

If an electric axle is used with an internal combustion engine, this can represent a P4 hybrid. This describes the electrically driven secondary axle, while the internal combustion engine drives the primary axle. A four-wheel drive can be represented by such a drive system as is known from EP 2 018 290 B1, where the internal combustion engine drives a first vehicle axle and the electric machine drives the second vehicle axle.

An electric axle can be integrated without affecting the installation space under the engine hood. When using an automated manual transmission, the interruptions in tractive force in the transmission on the primary axle can be filled by torque of the electric machines.

The power of an electric axle can also be comparatively easily scaled because there is enough space for the electric motor. A P4 arrangement takes up a similar amount of space to the transfer case of an all-wheel drive.

In a hybrid drive system with a connectable four-wheel drive via the electric axle, there is a conflict of objectives between a reduction in drag loss, that is to say optimization of the degree of efficiency while avoiding coupled motion of the electric machine, and the torque response time. Specifically in the case of high rotation speeds, it is important for the power of the electric machine provided to be provided by a rapid connection operation of the electric machine.

US 2004/147 366 A1 discloses a method for operating a drive system comprising an internal combustion engine or an electric machine as a primary drive and an electric machine as a secondary drive, wherein the electric machine is detachably mounted, together with an inverter and a controller, on one of the vehicle axles, wherein the electric machine and at least one switchable element are actuated in order to minimize drag losses of the electric machine during operation of the vehicle by way of the internal combustion engine over a wide speed range and to provide a defined connection time for the electric machine.

SUMMARY

This section provides a general summary of the disclosure, and is not a comprehensive disclosure of its full scope or all of its features.

The object of the present disclosure is to provide a method and a controller for operating a hybrid drive system which overcome the conflict of objectives by way of a special logic.

The object is achieved by a method for operating a drive system comprising an internal combustion engine or an electric machine as a primary drive and an electric machine as a secondary drive, wherein the electric machine is detachably mounted, together with an inverter and a controller, on one of the vehicle axles, wherein the electric machine and at least one switchable element are actuated in order to minimize drag losses of the electric machine during operation of the vehicle by way of the internal combustion engine over a wide speed range and to provide a defined connection time for the electric machine.

The method according to the present disclosure allows optimization of an electric all-wheel drive system, this leading to an improved design of the components. Costs can be saved as a result. Owing to the increase in efficiency of the drive system, it is possible to save energy and, for example, to use a smaller size of battery for the drive system.

However, the optimization of the drive system also involves the connection time for the electric machine not being allowed to exceed a certain threshold in order to maintain an optimum driving experience.

The speed range comprises the stationary state up to the maximum speed. The switchable element is any clutch, dog clutch, or multiplate clutch.

It is particularly advantageous in this case for the speed range of the vehicle to be divided into two ranges, wherein the first range starts from the stationary state of the vehicle, and the electric machine and the switchable element are actuated differently in the ranges.

The speed range of the vehicle is divided into smaller ranges depending on the electric machine used. However, the first range always starts from the stationary state of the vehicle.

In a preferred embodiment, the electric machine is part of an electric axle, wherein a four-wheel drive is implemented together with the internal combustion engine.

It has been found that it is advantageous when the first range of the vehicle speed extends up to the maximum speed in accordance with the WLTC cycle.

The boundary is not clearly drawn here, but rather can be adapted for the vehicle in question though still being in the region of the maximum speed in accordance with the WLTC cycle.

It is advantageous that in a second range the electric machine is actuated such that it rotates at a preset speed, wherein the connection to the vehicle axle remains interrupted.

As a result of this, the electric machine is available very quickly within the defined connection time, but the drag losses of the electric machine still remain within limits.

This second range for the speed range of the vehicle can be defined when an asynchronous electric machine is used. In this case, the inverter can be actuated such that the electric machine rotates at a low rotation speed, but the switchable element remains open.

In order to achieve the defined connection times, it is advantageous that in a third range of the vehicle speed, which comprises the maximum speed of the vehicle, the electric machine is coupled to the vehicle axle and rotates at the speed of the vehicle axle.

The object is also achieved by a controller for carrying out the method, having a control module which comprises a coupling and decoupling controller which couples or uncouples the electric machine as a drive element in a state-dependent manner.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure. In the drawings.

DETAILED DESCRIPTION

Figure 1:
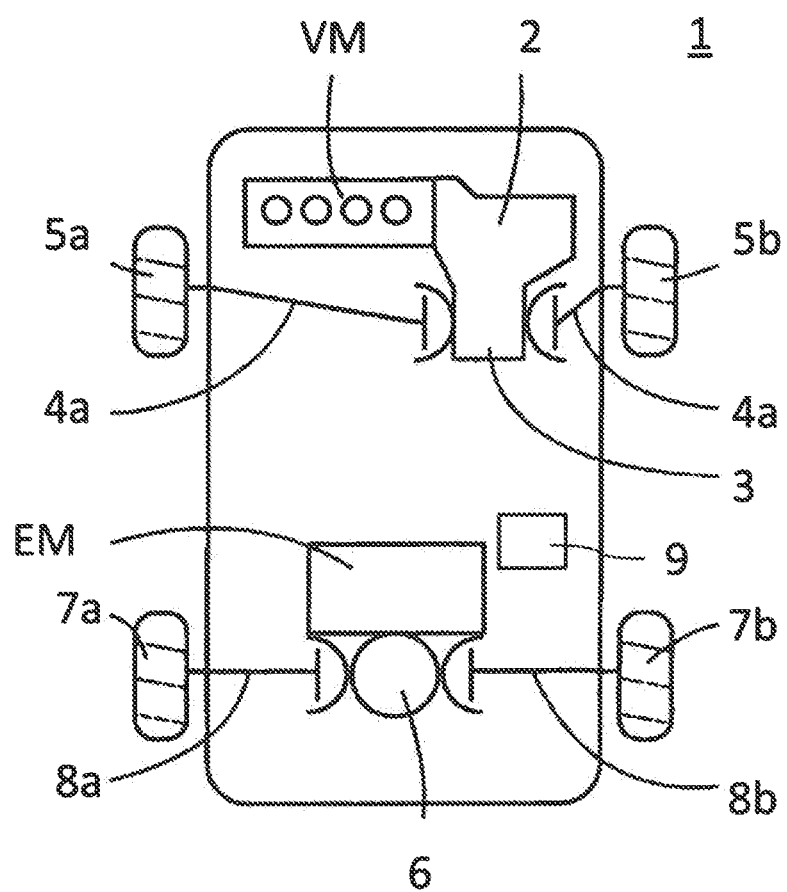
FIG. 1 shows a schematic drive train.

FIG. 1 shows a highly schematic illustration of a motor vehicle comprising a drive train 1 with two drive motors, specifically an internal combustion engine VM and an electric machine EM. The internal combustion engine VM is coupled to the front axle, comprising two propeller shafts 4a and 4b with the front wheels 5a and 5b, via a manual transmission 2 with a coupled differential gear 3. The electric machine EM is coupled to the differential 6 via a transmission, not illustrated, and said differential 6 is coupled to the rear wheels 7a and 7b via propeller shafts 8a and 8b, also referred to as the vehicle axle 8a, 8b. The electric rear axle drive can be used at low speeds, e.g. <30 km/h, as a single drive of the vehicle or can be connected to the front axle drive in order to implement all-wheel drive. A shift clutch, not illustrated, is used for this purpose. A controller 9 controls the electric machine and the shift clutch.

However, the present disclosure is not limited to configurations according to FIG. 1.

Figure 2:
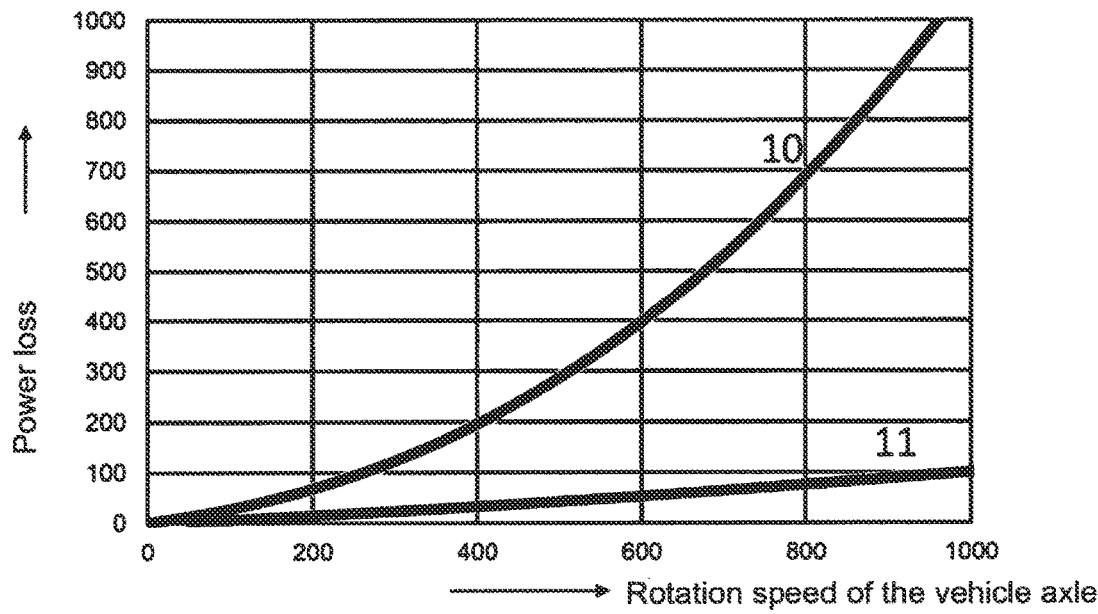
FIG. 2 shows a graph of the power loss with respect to the rotation speed of the vehicle axle.

FIG. 2 shows a graph plotting the power loss of a drive train 1 with respect to the rotation speed of the electrified vehicle axle. The curve denoted 10 shows the increase in the power loss as the vehicle axle speed increases. If the electric machine EM is decoupled, the situation improves dramatically, as illustrated by curve 11.

Figure 3:
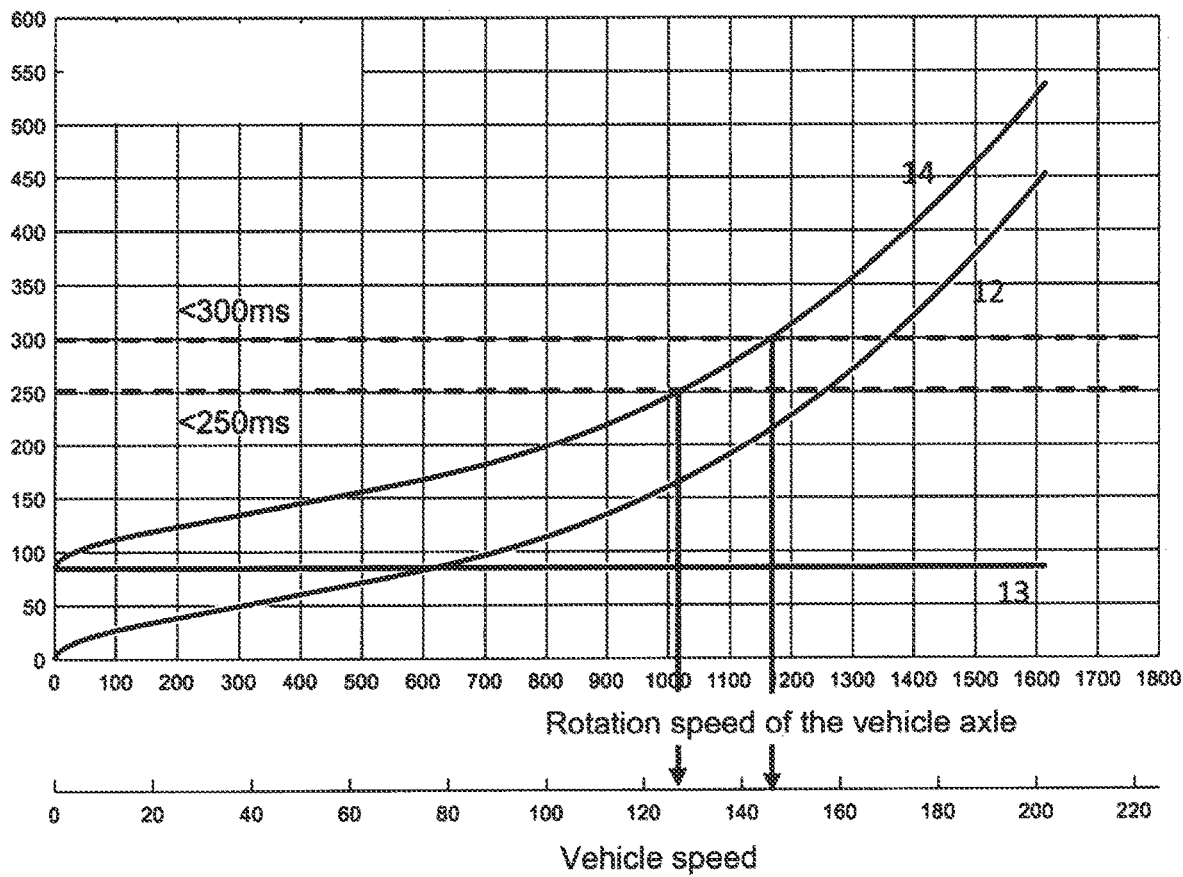
FIG. 3 shows an illustration of the connection times with respect to the vehicle speed.

FIG. 3 shows how the switching times change with respect to the speed of the vehicle axle and in relation to the second scale of vehicle speed.

The curve 12 shows the synchronization time, which is dependent on the peak power of the electric machine.

Curve 13 describes the purely mechanical connection time, which is specified by the clutch and its maximum engagement speed.

By way of example, connection times 14 of 250 ms and 300 ms are drawn as horizontal dashed lines.

Depending on the definition of the threshold for the connection times, a connection operation of the electric machine from the stationary state up to 128 km/h or up to 145 km/h is possible in the exemplary illustration, depending on the connection time.

Therefore, if a connection time of 300 ms is selected, the range of the vehicle speed from 0 to clearly above 140 km/h is covered, this corresponding to the entire WLTC speed range. The "Worldwide harmonized Light duty driving Test Cycle" WLTC is the test method for vehicles that is specified by the UNECE.

Figure 4:
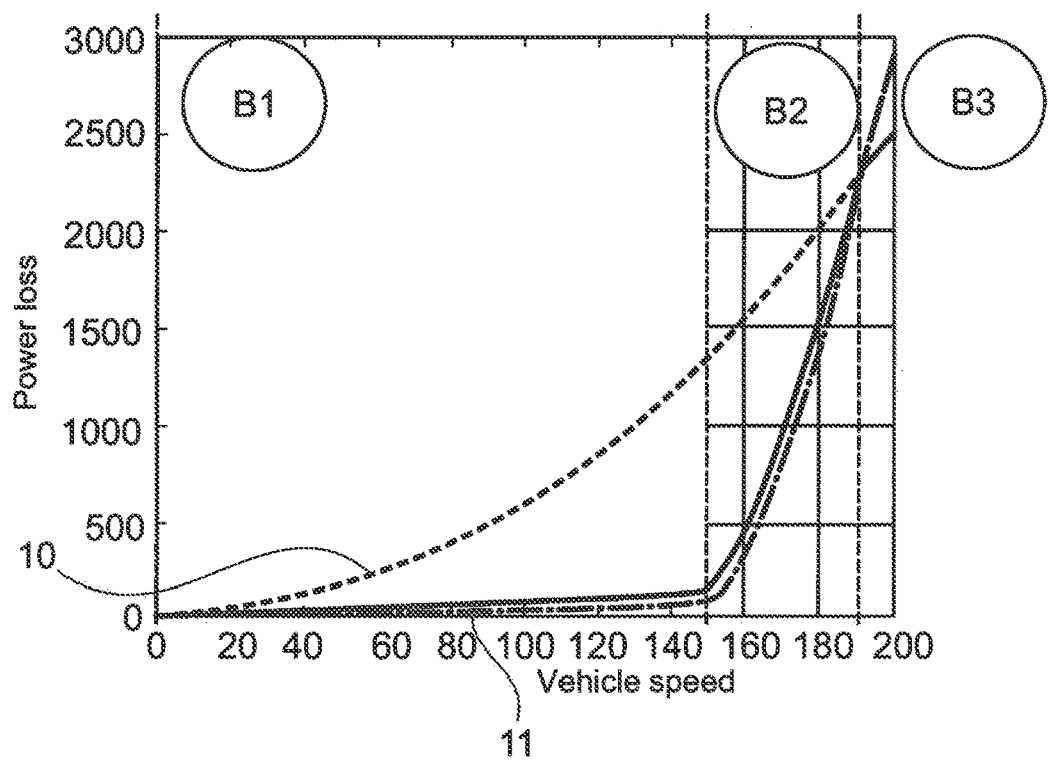
FIG. 4 shows ranges of the vehicle speed with different states of the controller, and FIG. 5 schematically shows a controller.

In order to achieve an optimum, as illustrated in FIG. 4, the entire speed range of the vehicle, in this case of from 0 to 200 km/h, is divided into 3 ranges. In the first range B1, the electric machine EM is decoupled from the vehicle axle 8a, 8b by the controller 9 via the switchable elements and the losses change in accordance with the curve 11.

In the second range B2, the defined connection times would no longer be able to be implemented. Therefore, the controller 9 switches the electric machine EM to active and rotates the electric machine EM at a low rotation speed, without connecting it to the vehicle axle 8a, 8b. This creates drag losses and electrical losses in the electric machine and in the inverter, but not to such an extent as in the case of purely passive coupled motion of the electric machine EM. In addition, the connection times of the electric machine EM can be shortened as a result.

In the third range B3 above 190 km/h, the electric machine EM is coupled and rotates at the speed of the vehicle axle 8a, 8b. The range B3 is defined when the losses in the electric machine EM while maintaining a particular specified speed are higher than the drag losses of the corresponding speed of the vehicle axle 8a, 8b. The individual ranges described herein are simulated for a vehicle by way of example. The ranges have to be adapted depending on the vehicle.

The controller 9 controls both the switchable elements and the electric machine EM. The 3 control states are:

From 0 km/h up to 145 km/h in the first range B1, the electric machine EM is decoupled and in the stationary state, the switchable elements are open, and the inverter is in a ready state.

From 145 km/h to 190 km/h in range B2, the electric machine EM is decoupled and rotates at a predetermined speed in order to achieve the required connection time. The inverter is activated and controls the speed of the electric machine, and the switchable elements are open.

From 190 km/h up to the maximum speed in range B3, the electric machine EM is coupled and rotates at the vehicle speed since maintaining the predetermined speed is less efficient than the drag losses at the corresponding speed. The inverter is once again in a ready state and the switchable elements are closed, it being possible for this to be implemented with an asynchronous machine.

The availability of decoupling is considerably expanded, specifically from the first to the second range, via such control in ranges. This optimizes the total efficiency of the vehicle and maintains the total time of the decoupling process provided that the dynamic connection time of the electric machine of 300 ms or for the total speed range up to the maximum speed is not exceeded.

The multi-stage control is advantageous since it leads to improved WLTC results in the speed range up to 135 km/h, that is to say to energy savings for the drive train.

Figure 5:
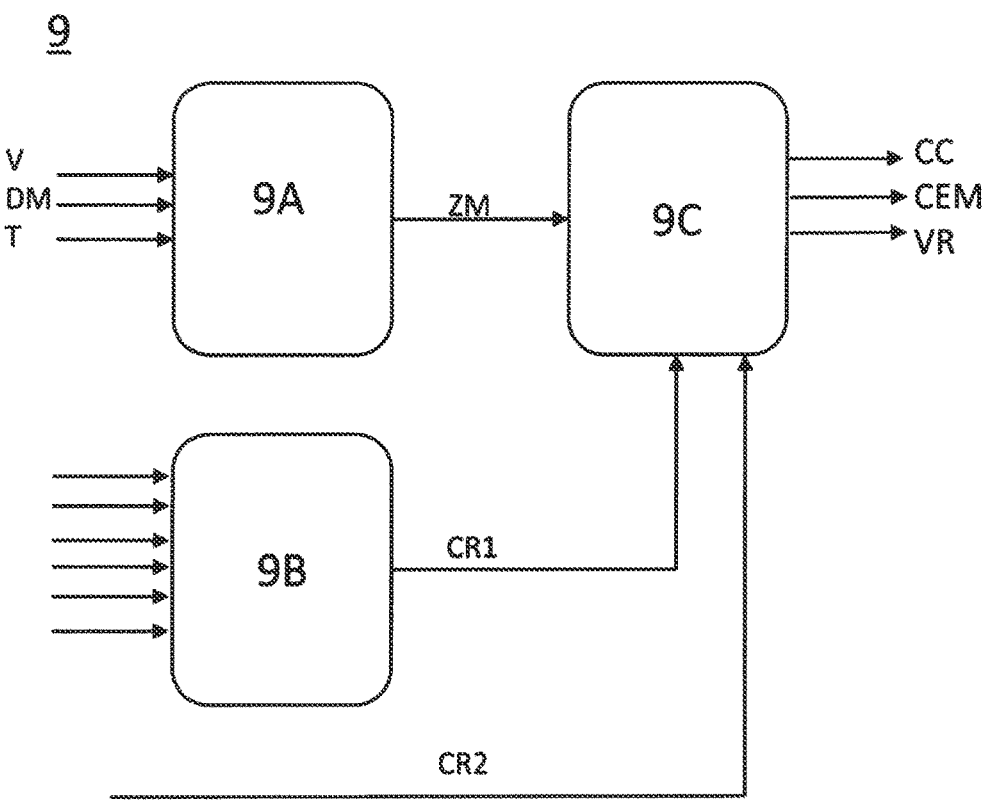

FIG. 5 shows, by way of example, the controller 9 with its modules. Module 9A is the control region in which the ranges B1, B2, B3 are stored and in which the decision is made as to which of the ranges is present and whether the electric machine EM should be coupled.

To this end, the vehicle speed v, the driving mode DM, and the available torque T are used as input variables. The connection mode ZM is output as a result.

The module 9B describes the control of the connection operation of the electric machine EM for a four-wheel drive. Here, the vehicle speed, the requested torque, road conditions, longitudinal accelerations, lateral accelerations, and yaw factor are queried at the input end. The connection operation CR1 is then requested at the output.

A dynamic controller of the vehicle can likewise request the connection operation CR2 via another input.

The requests CR1 and CR2 reach the module 9C which coordinates the torque and the driving mode. The module 9C may then output a signal CC in order to close the switchable elements. Furthermore, signals CEM for controlling the electric machine EM and the speed request VR are output to the electric machine EM.

FIG. 5 is a schematic illustration, the individual models 9A, 9B and 9C are illustrated by way of example and do not have to be present with such a division or arrangement. The individual control tasks can be run in different physical controllers.

What is claimed is:

1. A method for operating a drive train comprising an internal combustion engine as a primary drive and an electric machine as a secondary drive, wherein the electric machine of the secondary drive is detachably mounted, together with an inverter and a controller, on a vehicle axle of a vehicle, the method comprising:
    actuating the electric machine of the secondary drive and at least one switchable element in order to minimize drag losses of the electric machine of the secondary drive during operation of the vehicle by way of the internal combustion engine over an entire vehicle speed range of the vehicle and to provide a defined connection time for the electric machine of the secondary drive,
    dividing the vehicle speed range of the vehicle into multiple ranges,
    wherein a first range of the multiple ranges starts from the stationary state of the vehicle and the electric machine of the secondary drive, and
    wherein the at least one switchable element is actuated differently and the electric machine of the secondary drive is selectively coupled or uncoupled from the vehicle axle depending on which of the multiple ranges the vehicle is operating in,
    wherein the first range of the vehicle speed extends up to a defined speed of the vehicle in accordance with a WLTC cycle, the defined speed being a vehicle speed at which the defined connection time is possible, wherein the electric machine of the secondary drive is uncoupled from the vehicle axle within the first range;
    wherein, in a second range of the multiple ranges, the electric machine of the secondary drive is actuated such that it rotates at a preset speed, wherein the electric machine of the secondary drive remains uncoupled from the vehicle axle while in the second range, and
    wherein in a third range of the multiple ranges of the vehicle speed, which includes an overall maximum speed of the vehicle, the electric machine of the secondary drive is coupled to the vehicle axle and rotates at the speed of the vehicle axle.

2. The method of claim 1, wherein the electric machine of the secondary drive is part of an electric axle, wherein a four-wheel drive is implemented together with the internal combustion engine of the primary drive.

3. A controller for carrying out the method as claimed in claim 1, the controller comprising:
    a control module, the control module including a coupling and decoupling controller which couples or uncouples the electric machine as a drive element in a state-dependent manner.

4. The method of claim 1, wherein the first range is adapted to the vehicle.

5. The method of claim 1, wherein operating the electric machine at the preset speed in the second range reduces connection time relative to stationary and with reduced drag losses relative to a coupled condition with the axle.

6. The method of claim 1, wherein the electric machine is an asynchronous electric machine.

7. The method of claim 6, wherein the inverter is actuated such that the electric machine rotates and the switchable element remains open in the second range.

8. The method of claim 1, wherein in the first range, power loss reduces at a lower rate as vehicle speed increases relative to rate of power loss when the electric machine is coupled to the vehicle axle.

9. The method of claim 1, wherein in the second range the defined connection time cannot be implemented without actuating the electric machine at the preset speed.

10. The method of claim 9, wherein a threshold vehicle speed that defines a transition between the first range and the second range is based on the defined connection time.

11. The method of claim 9, wherein in the second range with the electric machine actuated at the preset speed, losses are created in the electric machine and in the inverter, wherein the losses are less than a passive coupled mode between the electric machine and the axle and define reduced losses.

12. The method of claim 11, wherein the reduced losses provide a shorter connection time of the electric machine.

13. The method of claim 1, wherein the third range is defined as a range of speed where losses in the electric machine while maintaining a specified speed via the electric machine are higher than drag losses at the corresponding speed of the axle when coupled.

14. The method of claim 1, wherein in the first range the electric machine is decoupled from the axle and in a stationary state, the switchable elements are open, and the inverter is in a ready state.

15. The method of claim 14, wherein in the second range the electric machine is decoupled and rotates at the preset speed that provides the defined connection time, the inverter is activated and controls the speed of the electric machine, and the switchable elements are open.

16. The method of claim 15, wherein in the third range the electric machine is coupled to the axle and rotates at the vehicle speed, the inverter is in the ready state, and the switchable elements are closed.

* * * * *